Jan. 7, 1941.   H. A. TEDTMAN   2,227,769
AUTOMOBILE VISOR AND MIRROR CONSTRUCTION
Filed Jan. 11, 1939

HENRY A. TEDTMAN
INVENTOR
PER
Albert J. Fihe
ATTORNEY

Patented Jan. 7, 1941

2,227,769

UNITED STATES PATENT OFFICE 2,227,769

AUTOMOBILE VISOR AND MIRROR CONSTRUCTION

Henry A. Tedtman, Chicago, Ill.

Application January 11, 1939, Serial No. 250,303

2 Claims. (Cl. 296—95)

This invention relates to an improved automobile visor and mirror construction and has, for one of its principal objects, the provision of a visor, particularly for the rear windows of automobiles, especially the more modern automobiles having what are termed "streamline" bodies.

One of the important objects of this invention is to provide a protective visor for the rear window of an automobile or the like which will prevent undesirable collection or condensing of rain, snow, sleet, ice or the like thereon with consequent hindrance to vision therethrough.

Another and further important object of the invention is the provision in a visor for automobile windows, particularly the rear windows thereof, which shall have integral therewith means for effectively draining rain water or the like so that there will be no danger of the same being drawn up under the visor by suction and thereby deposited on the surface of the window glass.

Another object of the invention resides in the provision of a front visor for an automobile and the incorporation of reflector means therewith whereby the ground or road at the front of the car and closely adjacent the front wheels or fenders thereof can be readily seen by the driver or operator without causing undesirable movement from the regular driver's seat.

Other and further important objects of the invention will be apparent from the disclosures in the accompanying drawing and following specification.

The invention, in a preferred form, is shown in the drawing and hereinafter more fully described.

Figure 1:
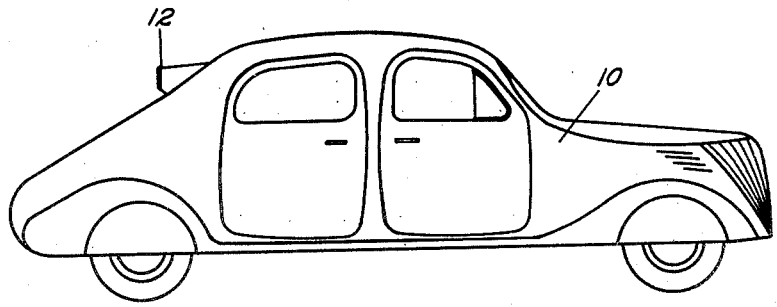
Figure 1 is a side elevation of an automobile, showing the improved rear visor construction of this invention applied thereto.

The reference numeral 10 indicates generally an automobile having the improved rear vision visor 12, which is an integral part of the inclined rear body panel, of this invention applied thereto.

Figure 2:
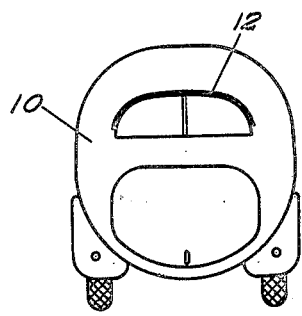
Figure 2 is a rear view of the device of Figure 1.
Figure 3:
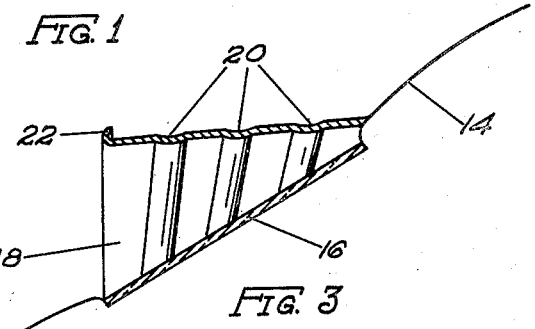
Figure 3 is an enlarged sectional view, showing a slightly modified form of construction.

As best shown in Figures 2 and 3, this comprises a hood-like structure which projects from the rear of the car over the rear window and adequately covers and protects the same from the deposit of snow, rain, sleet, ice, dust or the like thereon, while, at the same time, permitting adequate vision therethrough by means of the usual rear vision mirror.

In Figure 3, the device is shown enlarged, the back of the car being represented at 14, the rear window at 16, and the hood or visor construction generally at 18.

The hood or visor is preferably constructed of sheet metal and may be stamped or otherwise formed to a desired configuration so as to conform to the shape, size and contour of the window itself and also to conform in as great a degree as possible to the outline of the car itself, particularly the streamline rear portion thereof, while, at the same time, without detracting from any possibility of vision through the rear window 16.

It will be noted that both devices 12 and 18 may have corrugations or depressions therein such as shown at 20 in Figure 3, these providing gutter structures or the like which will serve to collect and dispose of rain water and even some ice and snow which may strike the back 14 of the car and run down onto the visor. These channels 20 automatically divert the major portion of this water or the like to the sides of the window 16 whereby any possibility of the same running over the rear edge and being drawn onto the surface of the window by air currents is practically eliminated.

In order to further guard against such a possibility, the upturned ridge 22 is provided which is integral with the visor 18 and which will effectively catch and stop any surplus water or the like which may possibly escape the gutters or channels 20. This surplus water or other material is also effectively guided down around the sides of the visor and away from the surface of the rear window.

The construction will operate equally as well with other vehicles in the automobile class such as motor coaches, busses and even on trains such as the observation cars of streamline trains, and where vision permits, the device may be applied to automobile trailers and similar structures.

Figures 5, 6:
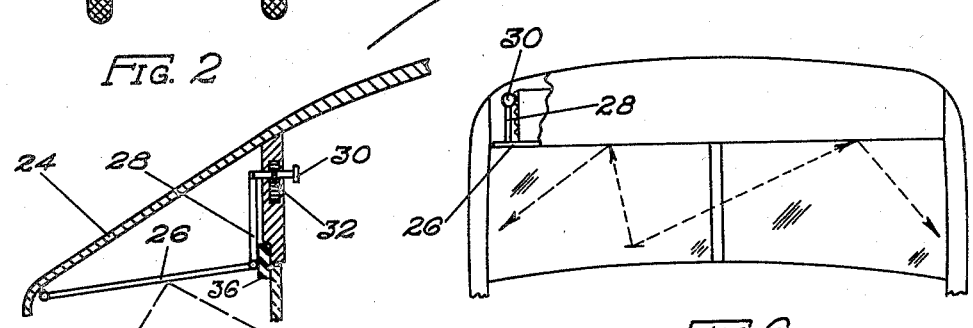
Figure 5 is an enlarged view of the structure shown in Figure 4.
Figure 6 is an elevation of the apparatus shown in Figures 4 and 5, and viewing the same from the inside of the car.
Figure 4:
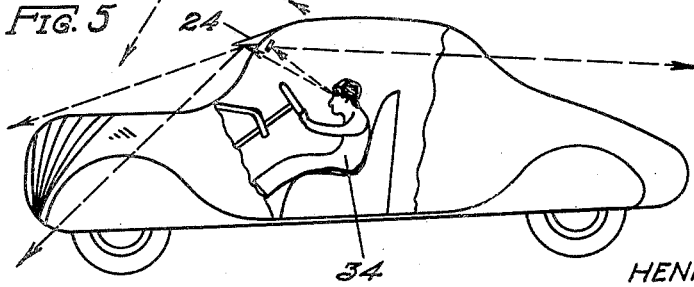
Figure 4 is a side view, parts being broken away, of an automobile or the like having the improved front and side vision devices of this invention applied thereto.

Supplementing the rear vision apparatus heretofore described, there is also provided a visor 24 at the forward portion of the car such as shown in Figures 4 and 5, this visor being, like the visors 12 and 18, designed so as to conform as nearly as possible, to the other contours of the car body and preserve its streamline appearance.

Beneath the visor 24 is provided a mirror 26 which is inclined slightly from the horizontal as best shown in Figure 5, and the angle of which may be adjusted slightly by any suitable device such as the link 28 and the operating knob 30 which is connected to a rack and gear construction 32 or some similar means whereby the angle of inclination of the mirror 26 may be varied to suit the individual needs of the operator 34 as illustrated in Figure 4.

As graphically shown in Figure 6, the line of vision of the operator travels upwardly onto the under surface of the mirror 26 and thence downwardly to each side of the car as shown by the dash lines, these lines being also present in Figures 4 and 5, whereby the road at one side of the car or the curb at the other or any other territory adjacent the front wheels of the car may be readily observed by the operator without the necessity of leaving his seat or assuming an uncomfortable and dangerous driving position. This eliminates to a great degree the tendency of some drivers to travel in the middle of the road for fear that they may be running off the shoulder on the right-hand side, inasmuch as some drivers, particularly those of short stature, in the modern streamline cars with low seats and high hood and engine constructions, find some difficulty in seeing portions of the road, particularly those portions adjacent the front wheels on either side of the car. By the use of the mirror 26, the roadway and also the shoulder of the road on either side of the car is clearly visible at all times, thereby enabling the driver to maintain a desired and necessary position on the highway, which is becoming increasingly necessary especially on narrow and two-lane highways. A rubber or similar cushion packing element 36 prevents dust, insects and other foreign matter from collecting beneath the visor 24 and on the upper surface of the mirror 26. The mirror also enables the driver to see portions of the roadway directly in front of the car not otherwise visible. Adjustable supports can be provided at both ends of the mirror.

Furthermore, the device is of considerable assistance in parking the car, as the operator will, by a single glance into the mirror 26, be enabled to determine the exact location of the curb and adjacent objects with relationship to the right front wheel, fender and other adjacent parts of his automobile.

It will be seen that the mirror providing vision to the front portions of the car and the visor which allows of rear vision at all times, even under very unfavorable circumstances, will act to provide better driving conditions for operators of automobiles equipped with these devices and the consequent lessening of accidents due to insufficient vision.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

1. A visor for rear windows of vehicles, comprising a hood-like structure positioned over the window and forming an integral part of the inclined rear body panel of the vehicle, the visor having channels in its upper surface for diversion of water to the sides thereof, and an upturned ridge at the rear edge of the visor, said ridge supplementing channels.

2. A visor for rear windows of vehicles, comprising a rigid hood-like structure positioned over the window and forming part of the inclined rear body panel of the vehicle, the visor being coextensive with the rear window and overlying substantially the entire area thereof, but extending practically horizontally in a rearward direction, thereby allowing unobstructed vision through the window and toward the rear.

HENRY A. TEDTMAN.